(12) United States Patent
Warnock

(10) Patent No.: US 7,277,925 B2
(45) Date of Patent: Oct. 2, 2007

(54) INTERNET DOCUMENT SERVICES

(76) Inventor: Kevin L. Warnock, 113 Warren Ave., San Francisco, CA (US) 94131

( * ) Notice: Subject to any disclaimer, the term of this patent is extended or adjusted under 35 U.S.C. 154(b) by 854 days.

(21) Appl. No.: 10/677,515

(22) Filed: Oct. 3, 2003

(65) Prior Publication Data

US 2004/0073708 A1    Apr. 15, 2004

Related U.S. Application Data

(63) Continuation-in-part of application No. 09/457,149, filed on Dec. 8, 1999.

(51) Int. Cl.
*G06F 15/16* (2006.01)
(52) U.S. Cl. .............. 709/217; 709/200; 709/219; 707/10; 715/523; 715/530
(58) Field of Classification Search .............. 709/200, 709/219, 203, 217; 707/10; 715/523, 530
See application file for complete search history.

(56) References Cited

U.S. PATENT DOCUMENTS 5,956,736 A * 9/1999 Hanson et al. .............. 715/513

6,101,486 A * 8/2000 Roberts et al. .............. 705/27

\* cited by examiner

*Primary Examiner*—Frantz B. Jean
(74) *Attorney, Agent, or Firm*—Richard B. Main

(57) ABSTRACT

A subscriber service for on-line document editing includes an Internet client in which a browser window is opened to begin XHTML editing, e.g., in Microsoft INTERNET EXPLORER. The text is transmitted to a host in a message over the Internet. In the host, a next process verifies this user has an account, or is otherwise authorized to use this site or access a particular document. A process receives the malformed XHTML typical of Microsoft INTERNET EXPLORER editing. A process cleans up this input, and converts it to fully formed XML, e.g., with TIDY freeware. A next process uses XSLT style sheets to transform the XML to LaTex source. Alternatively, the input is converted to Tex-type source lines. Another process includes a LaTex engine to typeset the input text according to the style sheets. Such produces a DVI-type output file. A next process converts the DVI to PDF. Commercial programs are available for this purpose. A process transmits the completed PDF file back to the client in a message. A next process at the client receives the PDF-formatted document. A further process allows such document to be printed at convenience. A final process notes the subscriber account at the host to track subscription charges and uses.

14 Claims, 2 Drawing Sheets

INTERNET DOCUMENT SERVICES

COPENDING APPLICATION

This Application is a Continuation-In-Part of U.S. patent application Ser. No. 09/457,149, filed Dec. 8, 1999 now abandoned, and such is incorporated herein by reference.

FIELD OF THE INVENTION

The present invention relates to the Internet, and more specifically to document, presentation, and other business services provided over the Internet through a user's browser or otherwise and saved as a PDF-file.

BACKGROUND OF THE INVENTION

The Internet is having a profound affect on every aspect of personal and business life. In the beginning, computers were standalone assets that did not communicate with each other very effectively. Now, the Internet and email support tremendous volumes of messages and downloads. Such makes it possible to decentralize where the actual processing for a particular job needs to be done.

Desktop computers developed such that operating systems are used to host and execute application programs. Spreadsheet, presentation, word-processing, graphics programs, and others were developed that could be hosted by the operating system. Each of these programs often costs a hundred dollars or more, and each user must pay no matter how little the application program is needed or used. Some bundling of common applications has occurred in the market. For example, Microsoft Corporation bundles WORD, EXCEL, POWERPOINT, etc., in their MICROSOFT OFFICE package.

Web browsers today are commonly provided for free. Netscape COMMUNICATOR and Microsoft INTERNET EXPLORER are the two major competing browsers, but INTERNET EXPLORER seems to clearly dominate. It seems likely that the Microsoft WINDOWS operating system will evolve to fully integrate browser functions. In fact now, INTERNET EXPLORER cannot be deleted from WINDOWS systems.

According to Adobe Systems (San Jose, Calif.), Portable Document Format (PDF) is the de facto standard for the secure and reliable distribution and exchange of electronic documents and forms around the world. PDF is a universal file format that preserves the fonts, images, graphics, and layout of any source document, regardless of the application and platform that was used to create it. Adobe® PDF files are compact and complete, and can be shared, viewed, and printed by anyone with the free ADOBE READER® software or other third party PDF readers. To date, more than 500 million copies of the READER software have been distributed. You can convert any document that you can print to Adobe PDF using ADOBE ACROBAT® software products, enabling business, engineering, and creative professionals to create, distribute, and exchange secure and reliable ADOBE PDF documents. For more information, see the ADOBE ACROBAT product family. PDF is the standard format for the electronic submission of drug approvals to the U.S. Food and Drug Administration (FDA), and for electronic case filing in U.S. Federal courts. The United Kingdom and Germany use PDF for electronic document exchange. The International Standards Organization ISO's PDF/X specification is the standard file format used for the digital distribution of advertisements for publication.

LaTeX is a typesetting system that formats text for producing attractive, professional-looking documents. LaTeX is enormously powerful and ubiquitous, but LaTeX input resembles computer programmer source code. So, it is not recommended for the inexperienced. A lot of useful information about Tex, LaTex, and PDFTex is available on the Internet at www.tug.org, the website of the TeX Users Group.

LaTeX has features designed for the production of technical and scientific documentation. LaTeX is the de facto standard for the communication and publication of papers on mathematics. LaTeX is a "macro package" for use with TeX, a sophisticated typesetting program invented by Donald Knuth in about 1978. LaTeX adds a set of commands to simplify the use of TeX. The LaTeX syntax may not seem very straightforward, but its ability to typeset math and foreign characters makes it ideal to use for technical papers.

During the 1980's, one of the major changes that occurred in computing was the development of highly versatile output devices. Unlike earlier impact printers, today's high-resolution ink-jet and laser printers can print a wide range of fonts and graphics. LaTeX is a software tool that allows users to take substantial advantage of such printing capabilities.

The popularity of word processing has led to the development of many software tools which are based upon what-you-see-is-what-you-get (wysiwyg) techniques. Professional typesetters and compositors evolved a complex set of rules and tricks for mixing fonts and typefaces to present the best look. Most books and documents the public now sees daily incorporate very advanced typesetting techniques. These are very difficult for wysiwyg word processors to incorporate, because, among many reasons, wysiwyg applications typically calculate line breaks and hyphenation as you type, not after all the text for the document has been input.

Ordinary laser printers have resolutions in the hundreds of dots per inch, but display screens are typically limited to less than hundred pixels per inch. LaTeX differs from wysiwyg tools like Microsoft WORD. In LaTeX, the designer of a document specifies their layout requirement in an abstract manner. The program translates these into the necessary details of typeface, font and size, e.g., making use of a set of rules of "style" that have been derived from type-setting experience. The LaTeX user need only specify the logical design of the document, e.g., in terms of chapters, sections, lists, etc. Concern with the physical layout is largely unnecessary.

The effect of this approach is that the document producer controls the appearance of the document indirectly, through a series of encodings which describe to the document processing package what the document should contain. These descriptions take the form of ordinary text files produced with any ordinary text editor; indeed, the whole armory of text-processing utilities may be used to "attack" LaTeX source files, which can lead to useful short cuts.

LaTeX commands may be thought of as a "mark up" language. The input to LaTeX consists of the raw text of a document, interspersed with directives that indicate how each part of a document is to be processed. LaTeX supplies a generous set of structures, as well as the means of adjusting some of their parameters where necessary. Overall, the effect is very like that of compiling a program, in that the ordinary text file source is run through a LaTeX program to produce a result quite different in nature from the input.

The output from LaTeX is not immediately printable. While a number of files of information may be produced, the main output is a device-independent file, usually given the extension ".dvi". Such files must be processed for display on a screen, or for output to a particular printer. A wide range of conventional programs are available for such translations. For example, open source and commercially marketed software tools are available to transform ".dvi" files into printable output. Programs are available to preview output that approximates the printed page on a workstation screen display. Other conventional programs can be bought to transform ".dvi" file into PostScript for output to a printer.

LaTeX is implemented as a set of macros for TeX, the underlying typesetting engine that does much of the real work. When LaTeX is processing an input source file and encounters an error, it responds with an often cryptic message. Therefore, placing all of LaTex's resources directly in the hands of ordinary users is not reasonably going to result in a satisfactory experience or much productivity.

SUMMARY OF THE INVENTION

An object of the present invention is to provide a document creation and processing for Internet users.

Another object of the present invention is to provide a system for reducing the costs of using business software.

Briefly, a business model embodiment of the present invention comprises selling business services over the Internet. A website allows visitors to author and create written documents in PDF format. Visitors can also create presentations, similar to those made offline using Microsoft POWERPOINT. Presentations are in PDF format, and are displayed by standard PDF readers. Some such readers can operate in full screen mode, without any menu bars showing, making them suitable for mimicking the full screen mode used by POWERPOINT during presentations shown to audiences with data projectors. PDF format files can be structured to allow presenters to cause new bullet items to appear dynamically on the same screen, as a speaker moves on to new talking points. The presenter taps a key and the next item appears onscreen, e.g., using a standard PDF READER capability. Largely, the same PDF generation technology may be used for both documents and presentations.

An advantage of the present invention is a business services website embodiment that enables users to produce high quality document processing at a low subscription cost, currently estimated to be US $1 per month, paid via credit card via recurring billing.

These and other objectives and advantages of the present invention will no doubt become obvious to those of ordinary skill in the art after having read the following detailed description of the preferred embodiment as illustrated in the drawing figures.

DETAILED DESCRIPTION OF THE EMBODIMENTS

Figure 1:
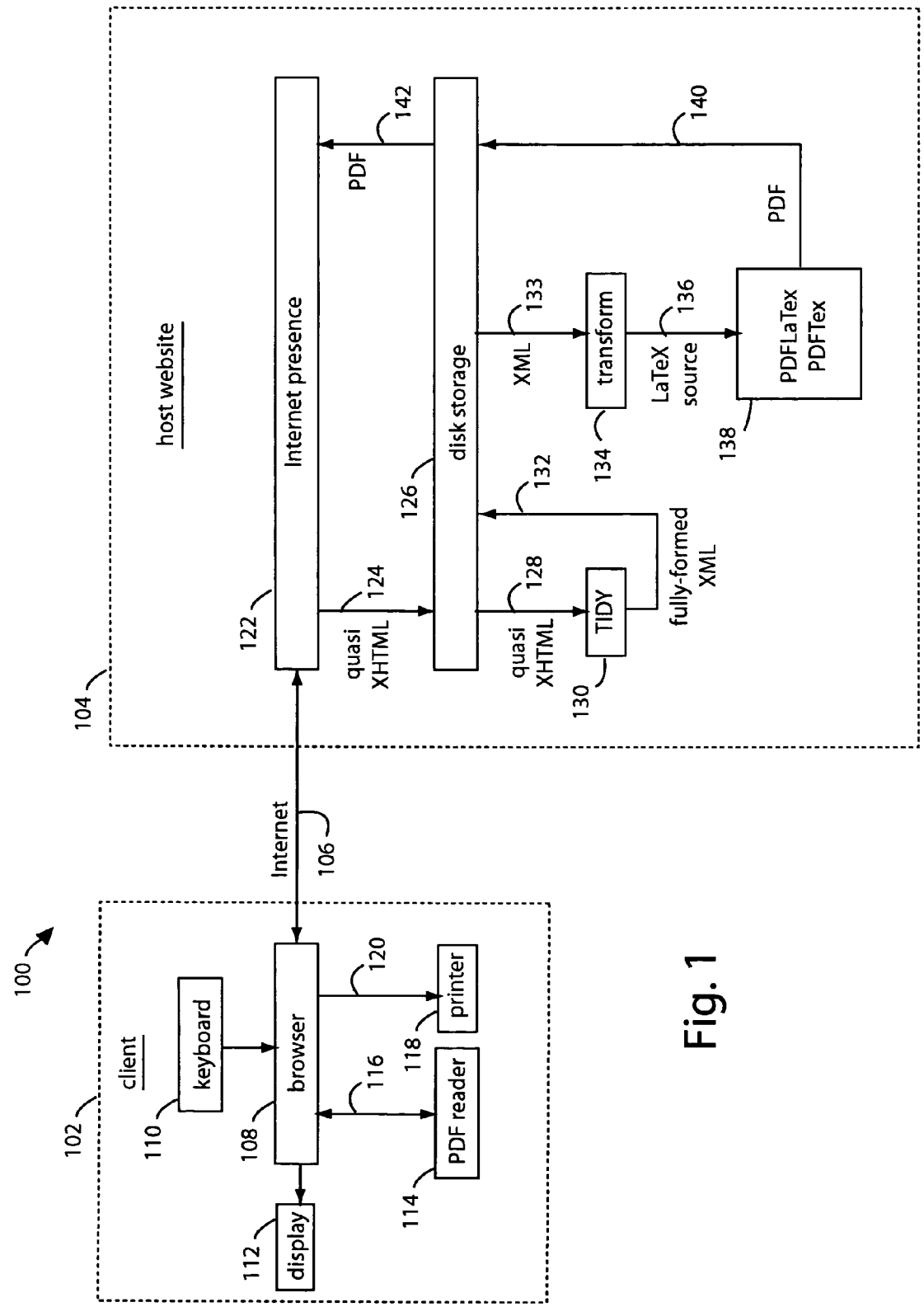
FIG. 1 is diagram of a system embodiment of the present invention.

FIG. 1 illustrates a web-service embodiment of the present invention, and is referred to herein by the general reference numeral 100. Such web-service 100 presents a local editing screen for users to type-in a document and then print out the result. Document processing and typesetting can be done remotely by the host.

The contribution of the HTML editor in the browser is not insignificant. The web service 100 comprises at least one client 102 that can log onto a host website 104 through an Internet connection 106. "Web service" has a particular meaning as used herein. In general, "Web services" imply a non-user-interface approach to delivering services, usually by encapsulating commands and replies as XML messages. The client 102 may include a standard browser 108, e.g., MICROSOFT INTERNET EXPLORER, an XHTML editor 109, an input keyboard and mouse 110, a monitor display 112, a PDF READER 114, a PDF-file connection 116, a printer 118, and a printer output connection 120. There are many other readers commercially available besides the most familiar one from Adobe.

The host website 104 comprises an Internet presence 122 that receives quasi-XHTML text 124 from the user at the client 102. The text is called quasi-XHTML because it is not necessarily well formed and possibly needs cleaning up. This could result from the use of the MICROSOFT INTERNET EXPLORER HTML editor. Such is represented as being enabled by editor 109 which provides the minimum amount of code necessary to turn on this editing feature in standard MICROSOFT INTERNET EXPLORER. A disk storage 126 saves the quasi-XHTML text files for processing. Such a file 128 is input to an XHTML cleanup program 130, e.g., TIDY freeware.

A now fully-formed XML 132 is forwarded via disk storage 126. When ready, an XML file 133 is retrieved and processed by an XSLT transform 134. Its output is industry-standard LaTeX source 136. A LaTeX→PDF or TeX→PDF application program 138 typesets the text accordingly into a polished PDF output file 140. This is stored in a private area of disk storage 126. When ready for shipment, the PDF output is sent in a PDF file 142 by Internet presence 122. This eventually makes its way back over Internet 106 to the PDF reader 114 for viewing on screen or printing on printer 118.

Sending the PDF back to the originating user represents one embodiment. If a user with a cell phone accessed a website, a document could be written via the keypad, but could not be viewed as a PDF file. Such users still may find value in the service, because they could in the alternate email the document to someone else, fax it out or have it printed out and mailed by postal mail or courier.

An HTML editor is standard starting with Version 5 of INTERNET EXPLORER, and this editor allows users to apply rich formatting, e.g., bold, italic and color. Users may click a button to advance to a following screen and then choose a letterhead background to place under their typed text. By clicking a thumbnail letterhead graphic, the text is submitted to the web server for processing. On some embodiments of the present invention, the text is saved to disk in a quasi XHTML format.

The XML compliant version of HTML is called XHTML. Observations have shown that the Internet Explorer HTML editor does not appear to produce perfect XHTML. So a clean-up utility is needed, e.g., as provided by TIDY software.

TIDY fixes a number of common, and not so common, mistakes in HTML files. It analyzes the markup text in a file and compares it to a standard-specification of HTML. TIDY fixes many of the problems it finds, and/or it can generate a log detailing the errors. TIDY can fix a wide range of problems, e.g., add missing or mismatched end tags, correct tags that are in the wrong order and insert quotes around attributes.

TIDY can be run with numerous command line options, and a configuration file for various program options and extended features. Such features include XHTML to XML conversion. There are options for formatting markup, and dealing with scripting languages. More information about the TIDY software can be found on the Web at http://tidy.sourceforge.net/.

Some embodiments of the present invention send the XHTML through TIDY, which outputs well-formed XML by fixing many input-XHTML syntax issues. Some embodiments of the present invention transform the XHTML via an XSLT style sheet to LaTeX format, e.g., performs an XSLT-transformation. LaTeX is a typesetting program built as a macro package for TeX that is a world standard for typesetting mathematical texts, among other scientific papers. The XSLT transformation converts the formatting attributes specified by the original HTML to the syntax for LaTeX. Some embodiments of the present invention also add various required strings to the LaTeX output, to create a proper LaTeX file and/or to add features not directly called for by the user typing the document. For example, the return address for the user can be inserted, even without the user typing it for each document authored. Instead, the return address could be solicited at sign up, and then reused for multiple documents.

Once a LaTeX file of the user's input has been captured, the disk file is run through PDFTeX or PDFLaTeX, which are similar to each other in overall function. PDFTeX and PDFLaTeX take TeX and LaTeX source, respectively, which are just text files, and convert them into a beautifully typeset PDF files. The files can be substantially better appearing than what most users can create using a word processing program such as WORD. The PDF file is saved to disk on some embodiments of the present invention. The web server then opens the PDF file and streams it to the user's browser. The document is viewable in Adobe Reader, the free PDF reader published by Adobe Systems, among many other readers. The whole process takes only a couple of seconds, so the typical user sees their completed PDF in just a few seconds. Subsecond response times are possible with some embodiments of the invention. There is little hint of the multiple steps that were just completed on some embodiments of the present invention.

Some embodiments of the present invention allow users to have an Internet-URL address assigned for the document just created. Anyone else is then free to edit or retrieve the document if they have the password for the document, which is disclosed to the user as part of the generation process. Such means web-service 100 will in essence offer a fully "editable" document format, even though PDF files are for the most part "not really editable." Some embodiments of the present invention give the illusion the files are editable by easily creating new versions. Limited editing of PDF files is possible in costly programs like Adobe Illustrator, but few casual users have those programs.

Third party users without the password can ask the author for permission to use and copy the document. An email can be sent to the author, asking for the password. Such would provide reasonable but not great security, because the password is sent to an email that presumably the author independently knows belongs to the person that purportedly sent a message asking for the password. It still is not that secure because the password is traveling as plain text via email. Some embodiments of the present invention could encrypt the email message. Some embodiments of the present invention could disclose the password in the PDF file itself, so that anyone with the PDF file would be able to "edit" it by pulling up the XHTML source in a browser and generating a new PDF. The password disclosure could be visible on face of the PDF document, where it could be seen alongside the actual document text. Or, the password disclosure could be made in the PDF file property page, perhaps as a "keyword" or in one of the other fields provided to display data about the document.

Multiple levels of editing can be permitted. One password might permit in-place editing, while another would only allow creation of derivative works from the original.

Some embodiments of the present invention have a repository of sample texts in multiple languages that users can use as is or edit as they desire, for example, to help them overcome writer's block. Users can be encouraged to donate their works of original authorship to the site, perhaps by giving them free or reduced price access and by describing the benefit to them later when many users contribute. Users could edit-out confidential information before donating their texts to the site. Texts can be categorized to make them searchable. Other users can be allowed to vote on the quality and usefulness of available documents. E.g., so that the good material floats to the top of listings. Such a library would differentiate web-service 100 from all the standalone OFFICE packages from Lotus, WordPerfect and Microsoft, because those applications offer few or no sample texts.

Some embodiments of the present invention may allow multiple users to work on the same documents at the same time. Such could be implemented by using an on-screen warning, perhaps in the form of a red light/green light traffic light, indicating when it is safe to edit a document passage. A first user starts editing when the indication is green. A next user to request the same document for editing is told the document is in use. The original user could be notified, perhaps through "instant messaging," that another user wants to edit the document. At that point, the original user could agree to stop editing and to release the hold on the document. Or they could agree to allow the document to be selectively locked.

Most documents that are good candidates to have multiple editors are longer than one paragraph, so sectioning a document into individually editable paragraphs seems a reasonable approach. Each user could lock out one or more paragraphs for undisturbed editing. Long documents could be effectively edited online by authors around the world, with no version control worries. This is in contrast with authors today who send their latest drafts to email distribution lists, where chaos can result.

Today, users frequently use the "track changes" feature in Microsoft WORD, which then imposes on someone the job of "accepting or rejecting" changes from possibly many contributors. Even the track changes feature requires, to the inventor's knowledge, that all edits be done on the same document file, which would limit simultaneous edits, which the proposed system permits. Embodiments of the present invention allow users to upload their own letterhead designs, which may be added to the thumbnail selection screen mentioned above. A plain white design is nevertheless offered to mimic standard word processors, which present users with a white screen by default.

Users can upload graphics in the HTML they submit, and browse their local disk for a graphic file, for example, a file that contained a graphic of their handwritten signature. They could then place this inside the signature block of their letters. The basic procedure is to capture each such graphic and store it on disk on some embodiments of the present invention. Then, the XSL style sheet has to write LaTeX instructions to tell PDFTeX or PDFLaTeX to include the just-saved disk files in the correct locations. Graphics can be placed in-line.

Users can email the PDF files from some embodiments of the present invention 100 to the recipients. The PDF files can be faxed from some embodiments of the present invention 100 to the recipients. Users can request that some embodiments of the present invention print out the PDF files and mail them by postal mail or courier to the recipients. Some embodiments of the present invention allow users to save their texts on some embodiments of the present invention, so that they can come back later and reuse their texts. Some embodiments of the present invention charge for storage, e.g., to discourage saving everything, maximize profits, and amortize hardware costs.

When some embodiments of the present invention send PDF files by email, they may either attach them to the outbound message, or just include a link to the file, as is done by the greeting card websites such as www.bluemountain.com. A monthly fee can be charged by credit card, or users can be given X-number of drafts and document storage credits for a fee. If they exceed their allotment, then in some embodiments of the invention there is an extra charge that can be assessed for each PDF file drafted or document stored. Such is designed to prevent abuse of the system, and to help limit password sharing intended to defraud.

Some embodiments of the present invention allow the site to be embedded into the web sites of other companies and organizations, so they can offer the services to their visitors. There are some issues related to this. Some embodiments of the present invention need a robust authentication system to allow embedding of the site that is the subject of this application into third-party web sites. When a third-party site signs up, have them buy X-number of credits, for PDF drafts, text storage and the like. To keep track of the drafts, a file is given that has X-number of rows, each row containing a globally unique identifier (GUID). Such is a large value guaranteed to be unique in the entire world. They are never reused to the knowledge, and are made unique because the Ethernet adapter address is used as a seed to generate the number. When a site wants to let a user draft a PDF file, that user is authenticated, e.g., with a password. The web server grabs one of the GUID's, and writes it out as a "password key" in the HTML string sent to the user to create the embedded instance of web-service 100. When the user clicks on a graphic thumbnail to create the PDF, the page will post to web-service 104's server, which will first read the GUID and compare it to a list of valid GUID's in its database of GUID's that have been sold. If valid, the PDF is created, and the GUID is marked "used" in the database, which means it can never be reused, even by the same web browser visitor.

If such user needs to make another draft, they will need to get another fresh GUID from the site where they were authenticated. Most likely, when a customer buys a block of GUID's, say 10,000, they will import each row into a row in a database, so they can also keep track of issued GUID's. Since not all users would "use up" their issued GUID's, perhaps by deciding not to generate a PDF after all, the unused GUID's could be recycled, perhaps by adding the unused GUID's to the file delivered to the website customer with their next order for credits.

The safety system described is, in part, required because when the end user creating a PDF clicks submit to start the drafting process, they are directly connecting to web-service 100, so some embodiments of the present invention cannot just check their IP address to be sure they are the customer that bought a block of GUID credits. The safety system can handle this in real time, e.g., by having the customer who bought the GUID's also put another unique identifier, perhaps a long session ID, into the HTML that embeds the instance of web-service 100 into their website. When the end user clicks "Submit", web-service 100 could read the GUID and the Session-ID, and in real time use the Internet to contact the customer website that bought the block of GUID's in the first place. That site could be listening for requests from the site for verification.

The site would ask "Have you issued this GUID under this session ID in the last hour?" If the response was yes, then draft the PDF, and if no, then don't draft and issue a warning that someone may be trying to circumvent security. Such multipoint contact is more trouble prone and difficult to implement, so some embodiments of the present invention may not use it. But in a high volume system, it may be the cleanest, most secure solution.

A free version may be offered to help promote the service. Some embodiments of the present invention may encourage users to sign up as paying customers. Others may restrict users from being able to print. PDF files can be created so they cannot be printed. When 'free' users create documents that are not printable, they may still choose to email them to recipients. The recipients may want to print the document anyway, and will be offered the opportunity to themselves sign up as a paying customer. As a paying customer, the site would allow the recipient to print the received document, in some embodiments of the invention by regenerating the PDF file but with printing permitted. This scenario allows lots of free users to help suggest to others that they sign up, by giving them a meaningful and immediate reason to sign up—to print the PDF they can see they want to print because it's right in front of them.

An advertising tagline can be placed into documents, e.g., emulating the free email services. For example, "This PDF document created online at silveroffice.com." Ads may also be embedded in documents, perhaps on the first or last page.

Users may be allowed to share letterhead graphics with other site users, similar to how they can donate text to the site for other users to use. PDF files can be accepted as submissions, so many companies may have their letterhead available as PDF. Users may be able to mark submissions as private, which would mean only they would see them once they logged in. Or, they could be public, in which case all users could see them. A voting system could be used so that good designs would float to prominence. Users may be permitted to post their names with their text and graphic submissions. For example, to give authors a way to get exposure, and a way for people searching to search by author.

Some embodiments of the present invention may offer users the ability to type their name/address info and the name/address info of the recipient within their PDF Reader software. E.g., by inserting a "form field" in the PDF in the correct places. Then, the user can type the bulk of their document online, take advantage of the PDF creation and the letterhead graphics, but type the more sensitive name/address information locally, where it would not be seen by some embodiments of the present invention 102. To be clear, the reason to allow sensitive information to by typed locally into a PDF Reader is because by doing so, the said sensitive information would never need to travel over the Internet.

PDFLaTeX and PDFTeX are command line console applications. They are not server applications and are not designed for server use. Nevertheless, one can execute the programs on a server. The operating system starts a separate process that runs the PDFTeX/PDFLaTeX program. Even with all this process creation, draft time is just a few seconds.

A good way to run PDFTeX/PDFLaTeX is to write a WINDOWS SERVICE, formerly known as NT Services. There is code to watch for a PDF generation request. Once a request has been detected, then PDFTeX/PDFLaTeX is invoked with the correct command line parameter(s). As soon as that execution has completed, the mechanism making the original generation request is notified that the PDF file was created, and the process listens for a next request.

MICROSOFT MESSAGE QUEUE SERVICE (MSMQ) can be used to coordinate requests for PDF generation from web servers, e.g., if the site gets too much traffic for one server to handle. MSMQ is a built-in feature of Microsoft WINDOWS 2000 and above. One of the great benefits of MSMQ is that it works across a network, so some embodiments of the present invention could have one or more web servers easily communicate with one or more machines running the WINDOWS SERVICE/PDFTeX/PDFLaTeX PDF generation software.

In one instance, web-service 100 is not meant to replace Microsoft OFFICE, or any of the other OFFICE suites. There are a lot of tasks the system will not likely ever handle. For example, some embodiments of the present invention do not handle automatic cross-referencing or table of contents generation.

Another almost equally effective way to create the PDF files is to use TeX, LaTeX or one of the dozens of TeX derivatives, like Omega. These can create so-called DVI files that can be viewed with "readers" similar to PDF readers and provide high-quality visual representations of the document that can also be printed. Before the rise of PDF as a world standard, DVI was widely used. DVI remains widely used today. There also exist converters that will convert DVI to Postscript. And there are converters to convert Postscript to PDF. So, it is just as effective, and actually more flexible, to forgo the usage of PDFTeX or PDFLaTeX, and instead use TeX or LateX, plus converters to go from DVI to Postscript to PDF. There may even be converters to go from DVI to PDF directly. The main downside to using the extra steps is that it might slow down PDF creation by a few seconds or less, to allow for the extra program(s) to be run. However, to a website visitor, the result is the same, except for a possible delay. TeX and all the flavors some embodiments of the present invention have mentioned are "freely" available, as executables and as source code. The website to start any research at is "http://tug.org".

Figure 2:
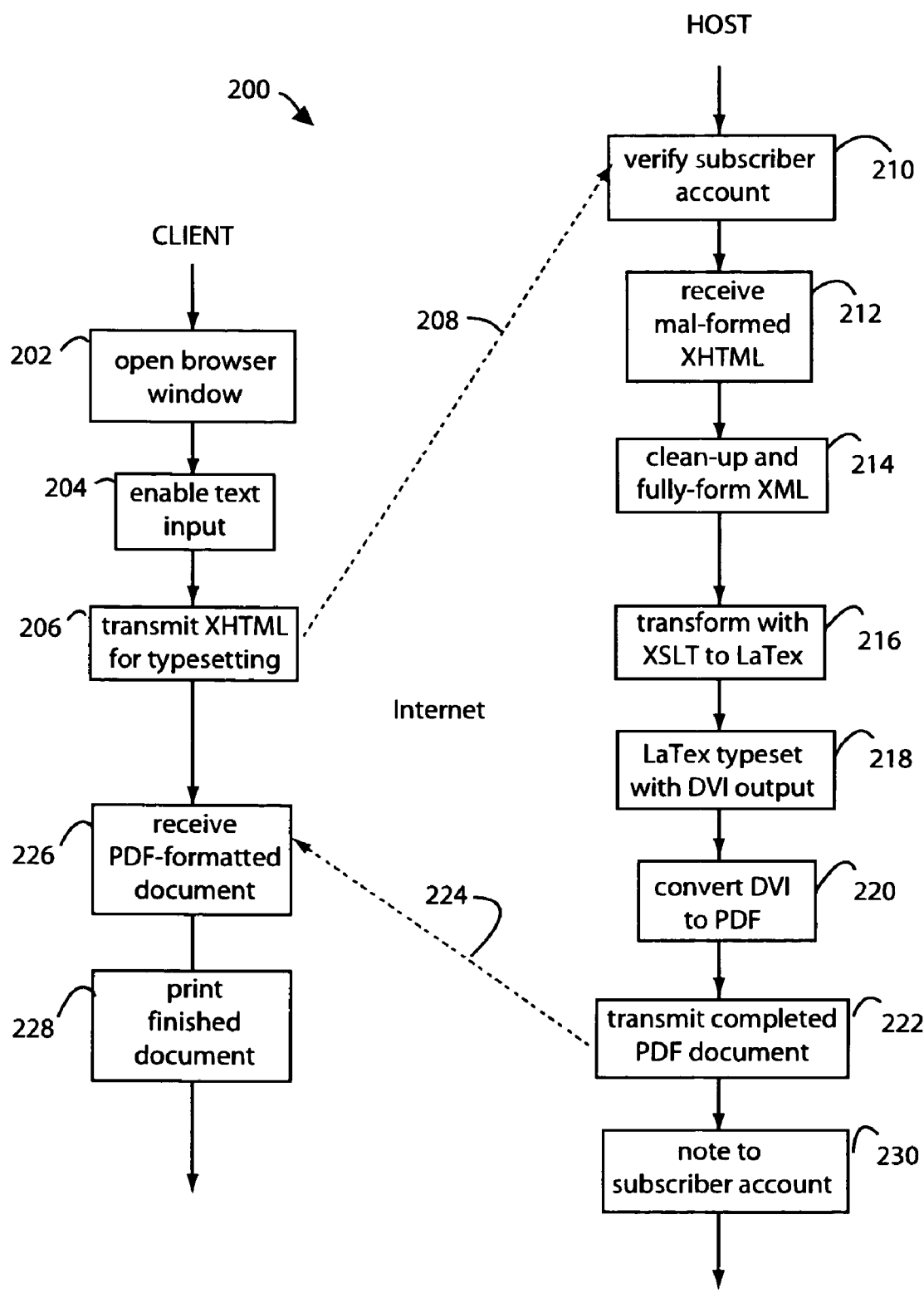
FIG. 2 is a flowchart diagram of a method embodiment of the present invention that is implemented on an Internet client and host system.

Referring now to FIG. 2, a method embodiment of the present invention is referred to herein by the general reference numeral 200. An Internet client runs a series of steps beginning with a step 202 in which a browser window is opened to begin document editing. A step 204 enables text input for XHTML editing, e.g., in Microsoft INTERNET EXPLORER. A step 206 transmits the text to a host in a message 208 over the Internet.

In the host, a step 210 verifies this user has an account, or is otherwise authorized to use this site or access a particular document. A step 212 receives the malformed XHTML typical of Microsoft INTERNET EXPLORER editing. A step 214 cleans up this input, and converts it to fully formed XML, e.g., with TIDY freeware. A step 216 uses XSLT style sheets to transform the XML to LaTex source. Alternatively, the input is converted to Tex-type source lines. A step 218 includes a LaTex engine to typeset the input text according to the style sheets. Such produces a DVI-type output file. A step 220 converts the DVI to PDF. Programs are available for this purpose. A step 222 transmits the completed PDF file back to the client in a message 224.

A step 226 at the client receives the PDF-formatted document. A step 228 allows such document to be printed at convenience. A step 230 notes the subscriber account at the host to track subscription charges and uses.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An Internet document service, comprising:
opening a browser window in an Internet client to begin document editing by accepting text input;
transmitting text to an Internet host in a message over the Internet;
receiving at said Internet host an XHTML text file from a client-browser editor;
converting said XHTML text file to a fully-formed XML;
using XSLT style sheets to transform said fully-formed XML to typesetting software source input text;
typesetting with a typesetting software engine of said typesetting software source input text according to said XSLT style sheets to produce an output file;
transmitting said output file back to the Internet client in a message;
receiving said output file as a portable document format (PDF) formatted document; and
printing said PDF-formatted document.

2. The service of claim 1, further comprising the steps of:
charging a user a fee for the service of returning a ready-to-print PDF-formatted document based on said text input.

3. The service of claim 1, further comprising the steps of:
using an HTML edit correcting utility program to assist in the step of converting said XHTML text file to a fully-formed XML.

4. The service of claim 1, further comprising the steps of:
providing for multiple users to access and edit a single one of said source input text with respective ones of said ready-to-print PDF-formatted documents being produced.

5. The service of claim 1, further comprising the steps of:
providing for multiple users to cooperatively access and edit a single one of said source input texts in a joint effort to generate a single one of said ready-to-print PDF-formatted document.

6. An Internet document service, comprising:
opening a window in an Internet client to begin document editing by accepting text input from a user;
transmitting said text input to an Internet host in a message over the Internet;
verifying said user has an account, or is otherwise authorized to use said Internet host or to access a particular document;
receiving at said Internet host a mal-formed XHTML from editing;
cleaning up such mal-formed XHTML input and converting it to fully-formed XML;

using XSLT style sheets to transform said fully-formed XML to typesetting software source input text;

typesetting with a typesetting software engine of said typesetting software source input text according to said XSLT style sheets to produce a device-independent (DVI) output file;

converting said DVI output file to a portable document format (PDF) file;

transmitting a completed PDF file back to the client in a message;

receiving said PDF file as a PDF-formatted document;

printing said PDF-formatted document; and noting a subscriber account at said Internet host to track client-user subscription charges and accesses.

7. An Internet document service, comprising:

document editing at an Internet client transmitting text collected in the step of document editing to an Internet host in a edit file over the Internet; verifying a user has an account, or is otherwise authorized to use said Internet host or to access a particular document;

receiving at said Internet host a mal-formed XHTML from editing;

cleaning up such mal-formed XHTML input and converting it to fully-formed XML;

automatically typesetting a source input text from said edit file according to style sheets to produce an output file;

transmitting from said Internet host said output file back to the Internet client in a message;

receiving at said Internet client window said output file as a fully typeset and stylized portable document format (PDF) formatted document; and making said PDF-formatted document available for printing.

8. The Internet document service of claim 7, further comprising:

charging a service fee for at least the step of automatically typesetting.

9. The Internet document service of claim 7, further comprising:

screening out some of said text files before allowing the step of automatically typesetting.

10. The Internet document service of claim 7, further comprising:

correcting any file format problems in said text files before allowing the step of automatically typesetting.

11. The Internet document service of claim 7, further comprising:

correcting text or graphic content in said text files before allowing the step of automatically typesetting.

12. The Internet document service of claim 7, further comprising:

adding text or graphic content in said text files before allowing the step of automatically typesetting.

13. The Internet document service of claim 7, further comprising:

deleting text or graphic content in said text files before allowing the step of automatically typesetting.

14. The Internet document service of claim 7, further comprising:

broadcasting said fully typeset and stylized PDF-formatted document output file to a plurality of Internet clients.

* * * * *